Feb. 17, 1942. R. WALLACH 2,273,677
ARTICLE AND PROCESS OF MAKING THE SAME
Filed Dec. 30, 1939
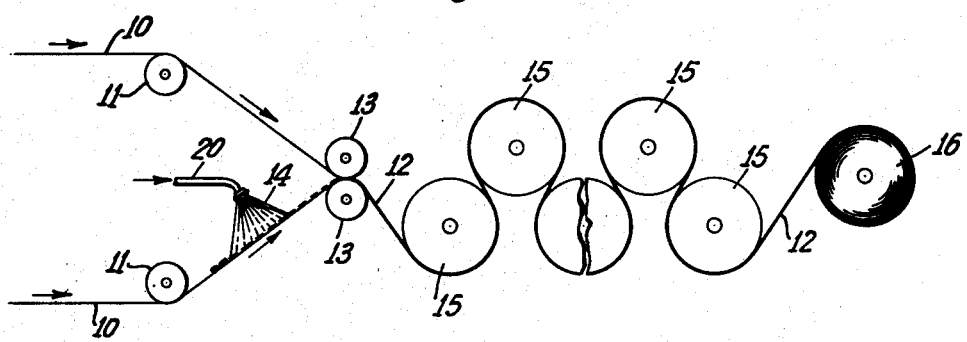
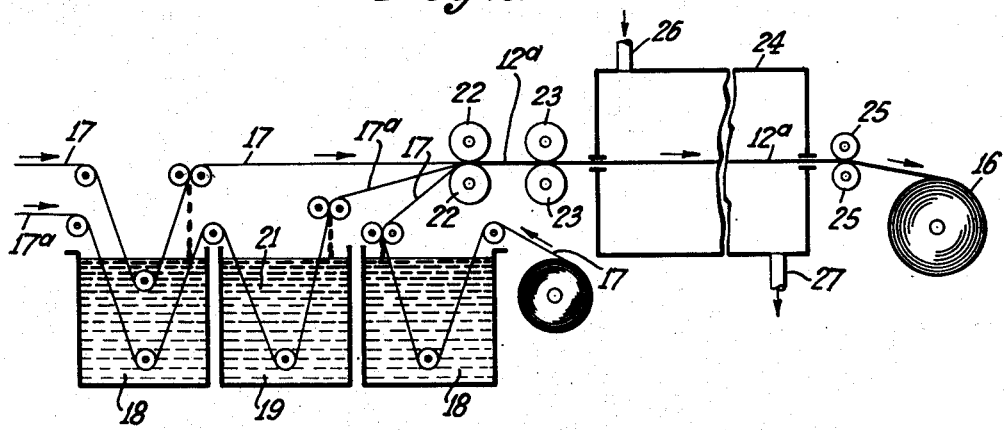
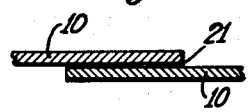
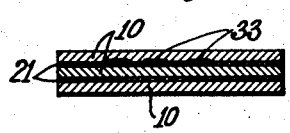
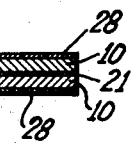
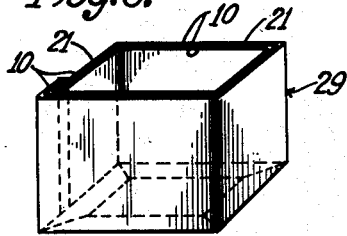
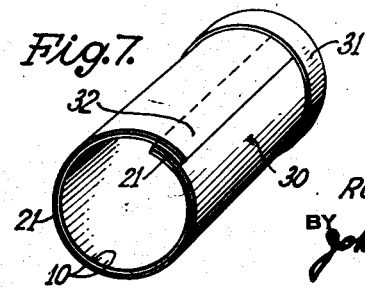
INVENTOR
ROGER WALLACH
BY John L. Osman
ATTORNEY Patented Feb. 17, 1942

2,273,677

UNITED STATES PATENT OFFICE 2,273,677

ARTICLE AND PROCESS OF MAKING THE SAME

Roger Wallach, Briarcliff Manor, N. Y., assignor to Sylvania Industrial Corporation, Fredericksburg, Va., a corporation of Virginia Application December 30, 1939, Serial No. 311,809

15 Claims. (Cl. 154—40)

The present invention relates in general to laminated sheet material and in particular to sheet material formed by laminating transparent water-swelling pellicles, and to a method for making such material. The invention also relates to correlated improvements designed to enhance the properties and to increase the utility of such articles.

There is a demand for transparent sheet material having sufficient rigidity to enable it to be made into self-sustaining shaped containers such as boxes. The thin sheets of Cellophane now commercially available are not sufficiently stiff for this purpose. Thicker sheets of Cellophane cannot be readily made from viscose by the present methods of manufacture because it is difficult to remove the impurities from such a thick sheet not withstanding repeated washings, and prevent such impurities and any occluded gas bubbles from detracting from the transparency of the sheet.

Attempts have been made heretofore to make thicker sheets by laminating non-moistureproof Cellophane to itself by using a variety of aqueous adhesives such for example as glue and starch. These adhesives are not satisfactory for laminating transparent pellicles such as Cellophane because such adhesives produce a product having an objectionable cloudiness. Moreover, when such aqueous adhesives are applied to a dry pellicle formed of a hydrophilic colloid in order to form laminated sheet material the pellicle swells unevenly and buckles. Furthermore, many of the common adhesives absorb moisture and as a result cause the layers making up the laminated material to separate.

Other attempts have been made to laminate such hydrophilic pellicles such as Cellophane by using adhesives comprising a hydrophobic colloid such as a cellulose derivative or a resin dissolved in an organic solvent. Such adhesives give unsatisfactory adhesion because of a difference in the coefficient of expansion of the adhesive and the Cellophane. The sheets thus comprising the laminated material after a time tend to separate and peel, and frequently such adhesives are discolored by light.

A general object of the invention is to provide a laminated sheet material formed from transparent pellicles formed of hydrophilic colloids.

Another object of the invention is to impart enough rigidity to the commercially available Cellophane pellicles to enable them to be used in the manufacture of shaped articles such as boxes, containers, window panes and the like.

Another object of the invention is to provide a method for building up a sheet of regenerated cellulose thicker than can be conveniently cast by methods now known.

A still further object of the invention is to provide transparent composite sheet material composed of a plurality of individual layers of a hydrophilic colloid which layers will not separate easily due to atmospheric or temperature changes.

Another object of the invention is to provide a shaped container formed in whole or in part of a relatively stiff transparent composite sheet material.

Other objects of the invention will in part be obvious and will in part appear hereinafter.

According to the present invention there is provided a transparent composite sheet material and shaped articles produced therewith comprising a plurality of pellicles of a hydrophilic non-fibrous cellulosic colloid united by an adhesive comprising a hydrophilic cellulose ether, that is, a water-soluble or an alkali-soluble cellulose ether. The invention also includes the method of making such a composite sheet material by uniting a plurality of transparent pellicles formed of a hydrophilic non-fibrous cellulosic colloid while the pellicles are in the wet gel state with an adhesive comprising a hydrophilic cellulose ether, pressing and drying the composite material thus formed, to produce a transparent, relatively stiff sheet material.

The invention accordingly comprises the several steps and relation of one or more of such steps with respect to each of the others, and the article possessing the features, properties, and the relation of elements, which is exemplified in the following detailed disclosure, and the scope of the invention will be indicated in the claims.

In the drawing which accompanies the specification and forms a part thereof, and in which like characters refer to like parts throughout the several figures:

Fig. 1 is a diagrammatical representation of means for laminating two pellicles to form the article of the invention;

Fig. 2 is a representation of other means for forming three pellicles of material into a laminated product of the invention;

Fig. 3 is a cross-sectional view of one embodiment of the article of the invention;

Fig. 4 is a cross-sectional view of another embodiment of the article of the invention;

Fig. 5 is a cross-sectional view of a third embodiment of composite sheet material of the invention; and Figs. 6 and 7 are perspective views of two embodiments of shaped containers which may be formed from the laminated sheet material of the invention.

The pellicles employed in the composite sheet material may be formed of organic film-forming hydrophilic colloids as a class, such for example, as water-soluble and alkali-soluble cellulose ethers, and cellulose hydrate. The cellulose hydrate may be obtained by regeneration from viscose or cuprammonium cellulose, or by the deesterification of cellulose esters and from solutions of cellulose in inorganic or organic solvents. Such colloids may be formed into pellicles in any known manner, and plasticized with a suitable water-miscible plasticizer such for example as glycerine, the glycols, and the glycol ethers in accordance with the accepted practice in the art. The individual pellicles may be made sufficiently thin to avoid difficulties in manufacture, purification and drying.

The adhesives used in laminating the pellicles comprise a cellulose ether of the types which are soluble in alkali solutions, those which are soluble in cold water but not in hot water, and those types soluble in both hot and cold water, and these media serve as the vehicle of the adhesive. Among the cellulose ethers of this class may be included the following: alkyl ethers of cellulose, hydroxyalkyl ethers of cellulose, mixed alkyl-hydroxyalkyl cellulose ethers, carboxy-alkyl cellulose ethers, and salts and esters of carboxy-alkyl cellulose ethers, all of which are hydrophilic in nature.

In a preferred embodiment of the invention, the pellicles are laminated to each other by applying an aqueous solution of an adhesive comprising a water-soluble cellulose ether to the pellicles while the pellicles are in the wet gel state and the pellicles then passed through pressure rollers to form a laminated article and finally the composite article subjected to an elevated temperature to dry the pellicles as well as the adhesive. The wet gel pellicles may be laminated during or immediately after their manufacture while still containing water or moisture and before drying, but if dry pellicles are used they are preferably wet with water and then laminated. The term "wet gel state" includes both such conditions of the pellicle.

The adhesive comprising an aqueous solution of a cellulose ether may be applied to the pellicles by brushing, spraying or dipping. The lamination of two pellicles may be conducted by applying the adhesive in the form of a coating to the inside surface of one pellicle before passing the pellicles into the pressure rollers. The lamination of three or more pellicles may be conducted by immersing the innermost pellicle in a bath containing the adhesive, wetting the outer pellicles, and then pressing all three wet gel pellicles together.

The pressure used to unite the pellicles may be applied by means of rollers or presses intermittently or continuously and such devices may be used cold or hot. The rollers are preferably sufficient in size and weight to cause the excess adhesive to be squeezed out of the composite article and to remove lumps, air-bubbles and the like.

Drying may be conducted in a manner known to the art by passing the composite article over a heated drying roller or through a heated drying chamber whereby the excess moisture content is substantially removed. The drying process removes the excess moisture from both the adhesive and the pellicles. The drying atmosphere may be conditioned with moisture to prevent excessive drying out of the pellicle, or to replace moisture in the pellicle where too great an amount is removed by excessive drying. If the dried composite sheet material is brittle, the material may be subjected to a post humidification at a moderate temperature to reimpart moisture to the pellicles. Acid may be used to coagulate the alkali-soluble cellulose ethers when such ethers are employed as adhesive materials.

By way of illustration, but not by way of limiting the invention, there is illustrated in the drawing a few embodiments of the article of the invention, and of the two methods for making the same.

In that embodiment of the process illustrated in Fig. 1 the pellicles are Cellophane and the lamination is effected immediately after the pellicles leave the glycerine bath of the usual Cellophane machine and while the pellicles are in the wet gel state.

Referring to the drawing, two transparent Cellophane pellicles 10 in the wet gel state are passed over rollers 11 which may also impart a slight tension to the pellicles as they pass from the glycerine bath (not shown). The cellulose ether adhesive 14 is applied to the inner surface of one of the pellicles by means of the spray 20, and the pellicles then pressed together by the pressure rollers 13. Laminated sheet material 12 thus formed is passed over a series of heated drying rollers 15, to evaporate the excess moisture from the composite article. The drying also coagulates, drys and insolubilizes the cellulose ether and thus forms a bond between the contiguous pellicles. After passing over rollers 15 the composite sheet material 12 may be wound into a roll 16.

Fig. 2 illustrates a modification of the process of the invention in which dry individual pellicles are used to form the laminated article. Such pellicles are wet before being laminated. For example, two dry, non-moistureproof Cellophane pellicles 17 are passed through baths 18 which contain water. One pellicle 17a, the pellicle intended to form the interior pellicle of the laminated article is passed through water bath 18 and then through a bath 19 containing an aqueous solution of cellulose ether. The sheets are then brought into laminating position by the draft pressure rollers 22. The laminated sheet 12a is passed through a second set of pressure rollers 23 to remove excess adhesive, air bubbles, and the like. The sheet 12a is drawn through a drying chamber 24 and kept under tension by means of the rollers 25, and then wound up on the reel 16. Heated air conditioned with moisture may be passed into the chamber 24 through the port 26 and out through the exit 27 to prevent the embrittlement of the material.

One embodiment of the laminated sheet material of the invention as shown in Fig. 3 comprises two transparent hydrophilic pellicles 10 united by a layer 21 of a cellulose ether.

Fig. 4 shows a cross-section of another embodiment of the article comprising three pellicles 10 formed of a hydrophilic colloid such as non-moistureproof Cellophane, united over their entire contiguous surfaces by an adhesive layer 21 comprising a hydrophilic cellulose ether.

In Fig. 5 there is illustrated a further embodiment showing a composite sheet comprising two hydrophilic pellicles 10 united by a cellulose ether adhesive layer 21, and coated on its external surfaces with a transparent, moistureproof coating 28.

Fig. 6 shows a box 29 which may be formed from laminated sheet material.

In Fig. 7 there is shown a cylindrical container 30 having a closure over an end 31. The container is formed from the sheet material of the invention comprising individual pellicles 10 joined by adhesive 21. The same adhesive used to join the pellicles may be used for forming the seam 32.

A moistureproof coating may be applied to one or both sides of the composite laminated sheet material during or after laminating, or the outermost pellicles only may be moisture-proofed before or after laminating on the external surfaces by suitable means and with suitable compositions known to the art, such for example as the compositions disclosed in U. S. Patents Nos. 1,989,683 and 2,121,023 which give non-tacky, transparent, moistureproof coatings.

The adhesive and/or pellicles and/or the composite sheet material may be colored by means of dyes, pigments, and the like. During the lamination decorative particles may be sprinkled on the adhesive or between the plies. The web may be printed with indicia 33 before laminating. Other inserts such as printed material may be inserted between the laminated sheets before or during manufacture.

The use of hydrophilic cellulose ether as the adhesive of the invention eliminates cloudiness and discoloration in the finished article, chiefly due to the fact that the adhesive has similar physical properties, and in particular, optical characteristics similar to the pellicles of hydrophilic colloids employed in the laminated article of the invention. For example, both the adhesive and the pellicles of the invention are hydrophilic, non-fibrous and transparent. In the preferred embodiment, where Cellophane is used, the adhesive and the pellicles are all cellulosic in origin, and are so closely related chemically that many of their optical and other physical properties and characteristics are substantially identical.

Transparency is preserved in the finished product because the indices of refraction of the pellicles and the adhesive are substantially the same.

This similarity in properties is conducive to making such a uniform, unitary laminated article which does not tend to peel or come apart. Due to the nature of the adhesive used in the invention crystallization never sets in. Discoloration by actinic rays and mold fermentation will not occur with the type of adhesive used in the present invention.

The thick, transparent sheet materials of the invention have sufficient rigidity to be useful for making various shaped containers, such, for example, as boxes and containers of all sorts and descriptions. Some examples of containers which can be made from rigid material are as follows: powder boxes, candy boxes, boxes for flowers, hat boxes, cigarette boxes, boxes for food products, and the like.

Since certain changes in carrying out the above process and certain modifications in the article which embody the invention may be made without departing from its scope, it is intended that all matter contained in the above description or shown in the accompanying drawing shall be interpreted as illustrative and not in a limiting sense.

I claim:

1. As an article of manufacture, a composite sheet material comprising a plurality of hydrophilic non-fibrous cellulosic pellicles united by a composition containing an adhesive consisting essentially of a hydrophilic cellulose ether.

2. As an article of manufacture, a laminated sheet material comprising a plurality of hydrophilic non-fibrous cellulosic pellicles united by a composition containing an adhesive consisting essentially of a water-soluble cellulose ether.

3. As an article of manufacture, a laminated product comprising a plurality of hydrophilic non-fibrous cellulosic pellicles united by a composition containing an adhesive consisting essentially of an alkali-soluble cellulose ether.

4. As an article of manufacture, a laminated sheet material comprising a plurality of pellicles formed of cellulose hydrate united by a composition containing an adhesive consisting essentially of a hydrophilic cellulose ether.

5. As an article of manufacture, a laminated sheet material comprising a plurality of pellicles formed from hydrophilic non-fibrous cellulosic colloids united by a composition containing an adhesive consisting essentially of a hydrophilic cellulose ether, at least one of the pellicles being of dissimilar composition from the remaining pellicles.

6. As an article of manufacture, a laminated sheet material comprising a plurality of pellicles formed from hydrophilic non-fibrous cellulosic colloids united by a composition containing an adhesive consisting essentially of a hydrophilic cellulose ether, all of the pellicles being of substantially the same chemical composition.

7. As an article of manufacture, a laminated sheet material comprising a plurality of pellicles formed of hydrophilic cellulose hydrate united by an adhesive consisting of water-soluble cellulose ether.

8. As an article of manufacture, a flexible laminated sheet material comprising a plurality of hydrophilic non-fibrous cellulosic pellicles united by a composition containing an adhesive consisting essentially of hydrophilic cellulose ether, said laminated sheet material having a moistureproof coating thereon.

9. A shaped container formed of a composite sheet material comprising a plurality of hydrophilic non-fibrous cellulosic pellicles united by a composition containing an adhesive consisting essentially of a hydrophilic cellulose ether.

10. In a process for making a composite sheet material comprising uniting a plurality of hydrophilic non-fibrous cellulosic pellicles while in the wet gel state with an aqueous composition containing an adhesive consisting essentially of a hydrophilic cellulose ether.

11. A process for making a composite sheet material comprising converting a plurality of dry hydrophilic non-fibrous cellulosic pellicles into a wet gel state by treating with water and uniting them while in the wet gel state with an aqueous composition containing an adhesive consisting essentially of a hydrophilic cellulose ether and drying the pellicles.

12. A process for making a composite sheet material comprising uniting while in the wet gel state a plurality of hydrophilic non-fibrous cellulosic pellicles with an aqueous composition containing an adhesive consisting essentially of a hydrophilic cellulose ether, pressing the pellicles together and drying the pellicles.

13. A process for making a composite sheet material comprising uniting while in the wet gel state a plurality of hydrophilic non-fibrous cellulosic pellicles with an aqueous composition containing an adhesive consisting essentially of a hydrophilic cellulose ether and drying in an atmosphere conditioned with respect to moisture.

14. A continuous process for making a composite sheet material comprising uniting while in the wet gel state a plurality of hydrophilic non-fibrous cellulosic pellicles with an aqueous composition containing an adhesive consisting essentially of a hydrophilic cellulose ether and drying the pellicles under tension.

15. A process for making a composite sheet material comprising uniting while in the wet gel state a plurality of hydrophilic non-fibrous cellulosic pellicles with an aqueous composition containing an adhesive consisting essentially of a hydrophilic cellulose ether and drying the pellicles and thereafter subjecting the pellicles to moisture to reimpart flexibility to the pellicles.

ROGER WALLACH.